March 31, 1959     D. W. TURNER     2,880,158
ELECTRIC EMULSION BREAKING TREATER
Filed Dec. 16, 1955     4 Sheets-Sheet 3

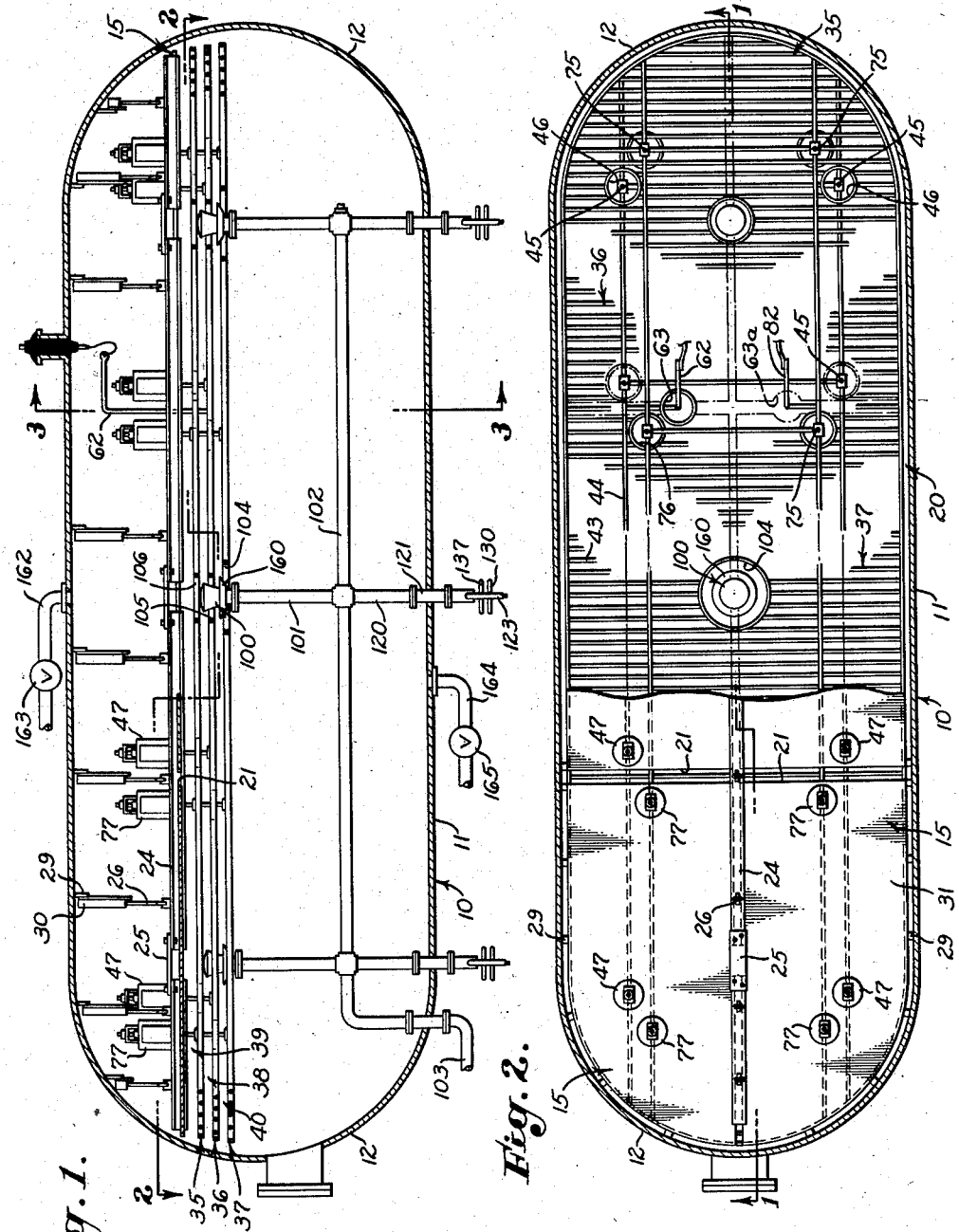

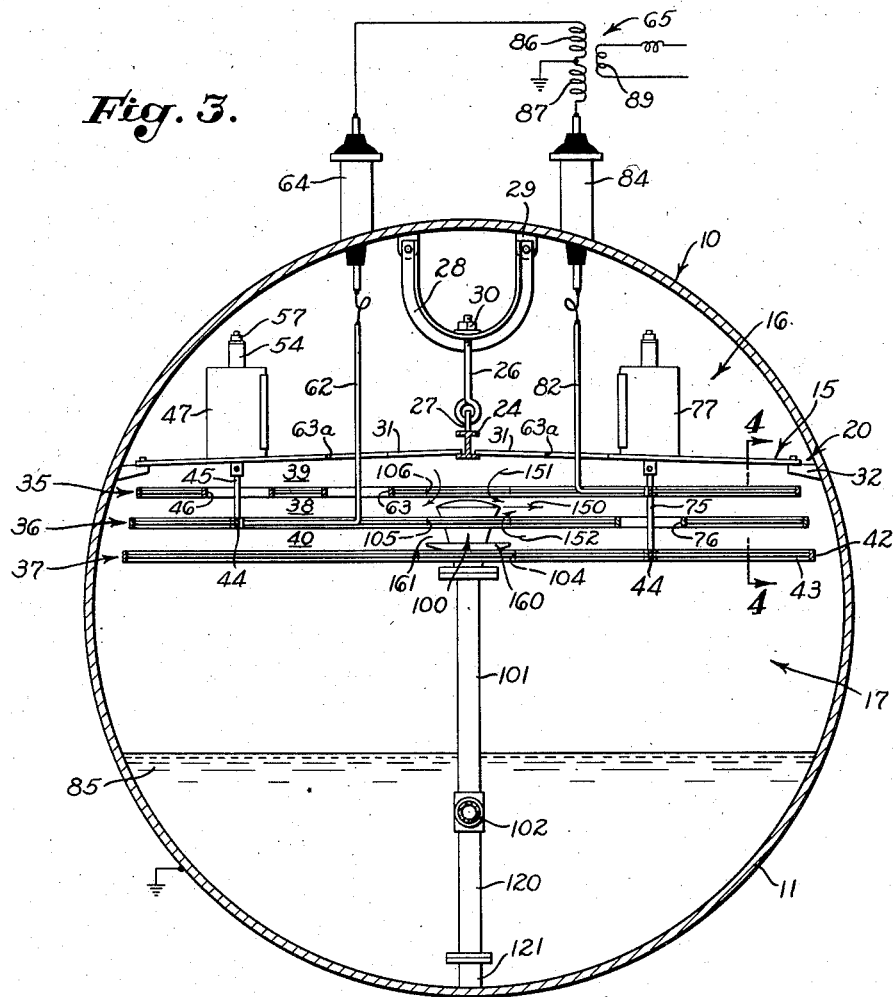
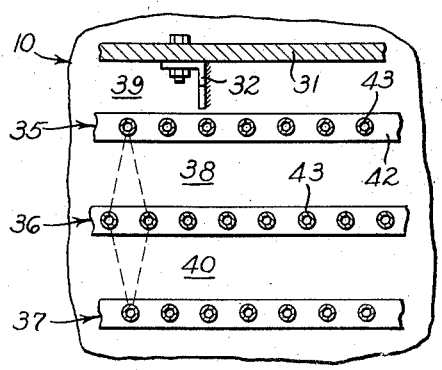

INVENTOR.
DELBER W. TURNER

BY HIS ATTORNEYS.
HARRIS, KIECH, FOSTER & HARRIS

March 31, 1959

D. W. TURNER 2,880,158

ELECTRIC EMULSION BREAKING TREATER

Filed Dec. 16, 1955

INVENTOR.
DELBER W. TURNER

BY HIS ATTORNEYS.
HARRIS, KIECH, FOSTER & HARRIS

United States Patent Office 2,880,158
Patented Mar. 31, 1959

2,880,158

ELECTRIC EMULSION BREAKING TREATER

Delber W. Turner, Houston, Tex., assignor to Petrolite Corporation, Wilmington, Del., a corporation of Delaware Application December 16, 1955, Serial No. 554,113

16 Claims. (Cl. 204—302)

This invention relates to electric treaters for emulsions and, more particularly, to electric treaters useful in the dehydration or desalting of petroleum emulsions or other emulsions of the water-in-oil type.

Most presently-used electric treaters employ electrodes positioned in a horizontal zone slightly above the midpoint of the container. The treated oil rises to and is withdrawn from a relatively deep oil zone above the electrodes. Tests have shown that with properly designed electrodes there is little settling of dispersed phase material from the oil in the oil zone; also that large spatial communication between the oil zone and the treating zone is undesirable, particularly when using horizontally-extending electrodes which treat the emulsion while moving radially outward from a central discharge position. It has now been found desirable largely to block off such spatial communication, thereby more nearly isolating the oil zone from the turbulence or circulatory currents therebeneath.

It is an object of the present invention to provide communication between the oil zone and the treating zone through relatively narrow passages, preferably passages positioned a distance away from the point of emulsion discharge. Such relatively narrow passages preferably comprise peripheral spaces between a substantially-horizontal baffle plate structure and the container. It is an object of the invention to use a substantially-horizontal baffle plate structure as the lower boundary of the oil zone; also to flow the treated emulsion constituents outwardly beneath such a structure and to settle most of the coalesced dispersed-phase material from the oil during such outward flow toward the relatively narrow spaces through which the oil can rise into the oil zone.

A further object of the invention is to use a stack of electrodes below such a baffle structure, this stack comprising a plurality of electrodes at different potentials, providing a relatively deep treating zone. This is particularly true when using emulsion distributors which jet the emulsion and tend to establish recirculation paths returning previously-treated constituents to the electric field through ring-type circulations. The baffle plate structure effectively blocks or drastically reduces recirculation paths above the distributor while accentuating recirculation below the level of the distributor. The deeper treating zone is effective in further treating the material circulating in the latter path to such an extent that lower jet velocities from the distributor can be used, often producing treated oil with a lower percentage of residual dispersed phase material therein. It is an object of the invention to provide an electric treater taking advantage of these discoveries.

A further object of the invention is to design an electric treater of increased efficiency from the standpoint of size, cost and product quality. In this connection, the treater of the invention presents new concepts in the effective use of space within a container. It permits treatment in a single vessel which previously would have required treatment in a much larger vessel or in a plurality of vessels.

Contributing to this result is the placement of the insulators in the present invention. Heretofore, live electrodes in electric treaters have been supported by strings of petticoat insulators suspended in the oil zone of the treater or in a space opening thereon. Such strings are expensive and space-consuming. It is an object of the invention to insulate two electrode members by mounting a housing one one of these members, preferably a member extending substantially horizontally in the treater container, this housing providing an insulator space closed at its top and open at its bottom to the intermember space, the other of the members being supported and insulated by an insulator in such insulator space.

Further objects of the invention lie in the provision of a novel emulsion distributor which can be easily cleaned of contaminating substances without adjusting its setting. A further object is to provide a distributor providing a narrow discharge passage adjustable in width by a positive mechanism, as distinct from structures in which the passage width is determined by spring action reacting against the pressure of the emulsion stream. It is also an object to provide an electric treater having a plurality of emulsion distributors each positively adjustable to vary the relative amounts of emulsion discharging therefrom.

Further objects and advantages of the invention will be evident to those skilled in the art from the accompanying drawings and the later description of a preferred embodiment. Referring to the drawings:

Fig. 1 is a vertical sectional view of the invention as applied to a high throughput horizontal treater;

Fig. 2 is a horizontal sectional view taken along the line 2—2 of Fig. 1, Fig. 1 being taken along the line 1—1 of Fig. 2;

Fig. 3 is a vertical sectional view taken along the line 3—3 of Fig. 1;

Fig. 4 is an enlarged fragmentary view taken along the line 4—4 of Fig. 3;

Figure 5:
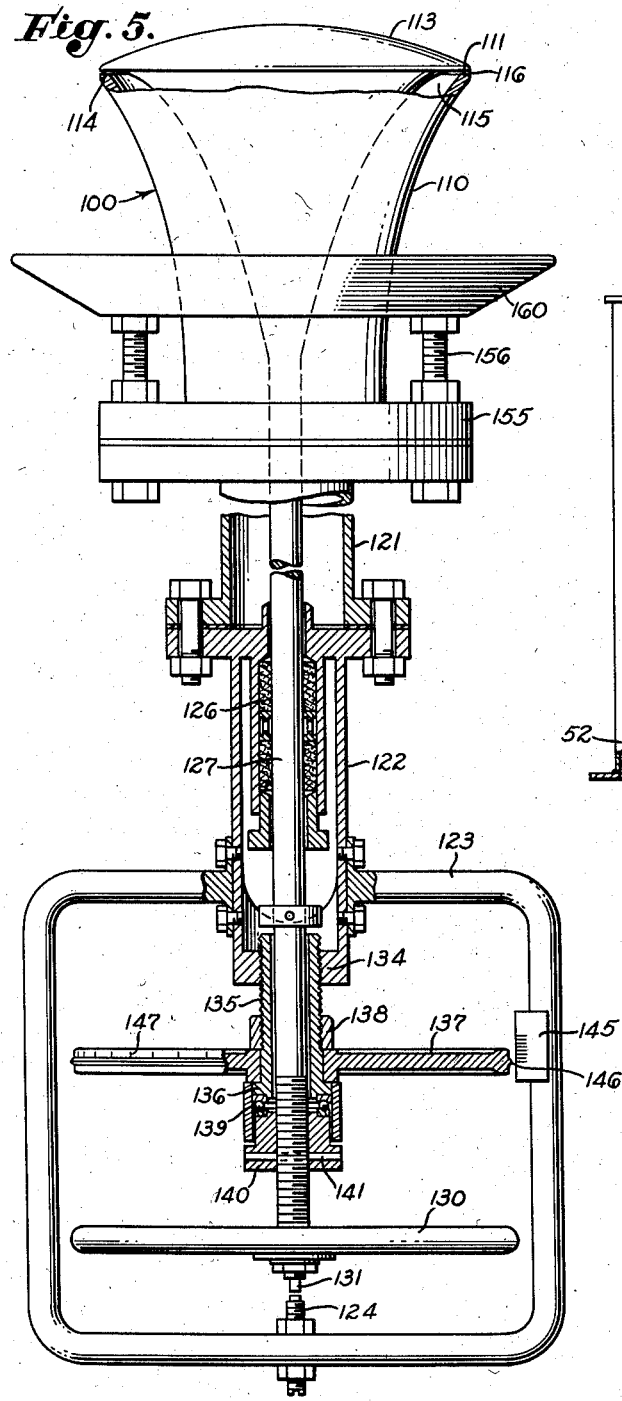
Fig. 5 is a view, partially in vertical section, of a typical distributor employed in the treater of Figs. 1–3.

The invention will be exemplified as applied to a multi-unit horizontal treater capable of high throughputs in a relatively low-cost insulation. It includes a horizontally-elongated container 10 comprising a cylindrical section 11 closed by domed heads 12, being typically a pressure container of a width or diameter of 10–15 feet and of a length varying from twice to at least five times the transverse width.

One of the important features of the invention is the use of a substantially horizontal baffle plate structure 15, best shown in Figs. 1–3, which divides the container 10 into an upper or oil zone 16 and a lower or treating zone 17 in the upper end of which is disposed the electrode stack to be described. The baffle plate structure is substantially impervious in the sense of being nonforaminous and having no large openings providing spatial communication between the zones 16 and 17. It may be a single or composite member longitudinally traversing the container, preferably at a position above the midsection, but is more conveniently a sectional structure, corresponding in the number of sections to the number of emulsion distributors used. The drawings illustrate a three-section construction.

The zones 16 and 17 are in communication substantially exclusively through one or more narrow spaces displaced radially from the emulsion distributors. As illustrated, the peripheral edge of the baffle plate structure 15 is spaced a small distance from adjoining walls, e.g., the wall of the container 10, to provide a narrow peripheral space 20 forming substantially the sole communication between the zones 16 and 17 and through which the oil may rise from the latter to the former. The narrow peripheral space can be composed in part of transverse spaces 21 (Fig. 2) between the baffle means of the adjacent sections of the baffle plate structure 15. Commonly, the area of the peripheral space 20, including the transverse spaces 21 if used, will desirably be less than 20% and usually less than 10% of the cross-sectional area of the container at the level of the baffle plate structure. Restricted spaces of an area as small as 5% or somewhat less can sometimes be used. The width of portion of the peripheral space bounded by the container wall will ordinarily be no more than a few inches, typically about 1–6 inches.

The baffle plate structure 15 is preferably at ground potential, as is the container 10. This gives rise to many advantages including the possibility of using the insulator supports to be described and the elimination of electric fields in the relatively narrow peripheral space 20 and in the oil zone 16, the latter eliminating parasitic electric loads by current leakage to grounded elements in the oil zone and releasing electric energy for useful treating in the zone 17.

It is also preferable to support the baffle plate structure 15 at a plurality of positions spaced longitudinally of the container, these positions being either central or peripheral, preferably both. Figs. 1–3 illustrate a supporting member comprising an I beam 24, shown as made up of individual sections joined together within the container by bars 25 (Figs. 1 and 2) to facilitate assembly within the container. The I beam 24 extends longitudinally of the container along the centers of the baffle means of the three sections, being supported by a plurality of hangers 26 in the form of eye bolts having their lower ends looped through tabs 27 of the I beam and being suspended in a vertical plane bisecting the container by use of U-shaped brackets 28 bolted to tabs 29 welded to the top of the container. The eye bolts are threaded to receive nuts 30 which can be adjusted to align or change the vertical position of the I beam 24. Baffle plates or members 31 are secured to the lower flange of the I beam and extend sidewardly to rest on and be bolted to brackets 32 of the container. The elevation of the I beam is preferably such as to slope the members 31 downwardly toward the narrow peripheral space 20, facilitating discharge of any small amount of dispersed-phase material that might separate in the oil zone and also facilitating washing from the baffle members, during shutdown of the treater, any sediment accumulating thereon.

The baffle plate structure 15 may constitute the uppermost of a stack of interspaced electrodes shown as including upper, intermediate and lower electrodes 35, 36 and 37. A main treating space 38 is formed between the electrodes 35 and 36 while auxiliary treating spaces 39 and 40 are formed respectively between the electrode 35 and the baffle plate structure 15 and between the electrodes 36 and 37. Each of the electrodes 35, 36 and 37 is preferably foraminous and may be composed of a peripheral frame 42 slightly smaller but of corresponding size as compared with the corresponding horizontal cross section of the container 10. Each frame 42 is spanned by a plurality of spaced rods or pipes 43, as best shown in Figs. 3 and 4, representing the electrode elements bounding the electric fields that are established in the spaces 38, 39 and 40. Cross members 44 (Figs. 2 and 3) may reinforce the pipes 43 at intervals.

Figure 6:
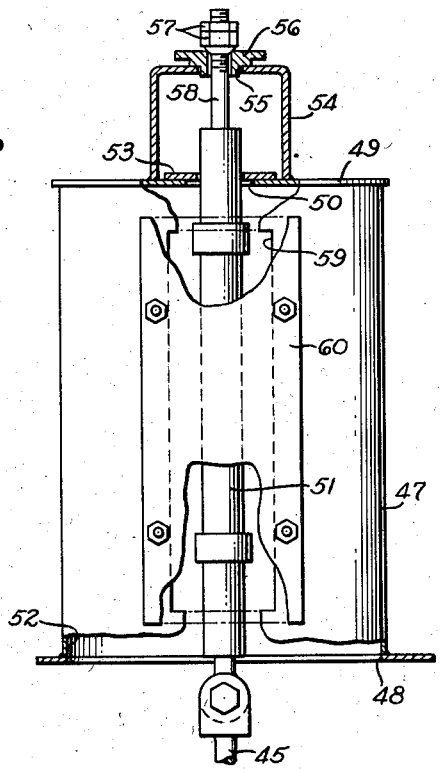
Fig. 6 is an enlarged fragmentary view showing the insulator mounting of the invention.

All of the electrodes 35—37 are uniquely supported from the baffle plate structure 15. For example, the intermediate electrode 36 is supported by a plurality of hangers 45 depending through framed openings 46 of the upper electrode 35. Correspondingly positioned housings 47 are spaced along lines parallel to and on opposite sides of the axis of the container and are respectively secured to the baffle members 31 to cover holes 48 therein, see Fig. 6. The upper end of each housing 47 is closed by an end plate 49 having a hole 50 of sufficient size to receive a stick insulator 51 hanging within an insulator space 52 and connected at its lower end with the hanger 45. A washer 53 of insulating material may surround the upper end of the insulator and rest on the end plate 49.

The insulator space 52 is open at its lower end to the treating space 39 but is closed at its upper end so that it does not form any open passage for oil from the treating space 39 to the oil zone 16. In this connection, the upper end of the housing 47 provides a cap 54 having an opening 55 preferably of sufficient size to pass the stick insulator 51 but closed by a washer 56 from which the insulator adjustably hangs through use of lock nuts 57 threaded to an upper pin 58 of the insulator. If desired, one side of the insulator space may be accessible through an access passage 59 normally closed by a plate 60. The insulator space 52 may be filled around the insulator 51 with any suitable dielectric fluid. With most electric treaters it is possible to use a body of treated oil which becomes trapped therein during use of the treater. It will be observed that the electrode 36 provides an energizing means including a rod 62 (Fig. 3) rising through a framed opening 63 of the electrode 35 and an aligned opening 63a formed by opposed cut-out portions of adjacent sections of the baffle plate structure 15. A bushing 64 conducts to the rod 62 a high-voltage potential from a suitable potential source 65.

The upper and lower electrodes 35 and 37 are supported as a unit by hangers 75 secured rigidly thereto and traversing a framed opening 76 of the intermediate electrode 36. As before, the upper ends of the hangers 75 are suspended from stick insulators respectively housed in insulator spaces of housings 77 constructed identically with the housings 44 and arranged in two lines paralleling and on opposite sides of the vertical midplane of the container. An upstanding electrode-energizing rod 82 extends through another of the openings 63a, being electrically connected through a bushing 84 to the potential source 65.

It is preferable to maintain a double-voltage electric field in the main treating space 38 and in the auxiliary treating space 40. At the same time, single-voltage fields are desirable in the auxiliary treating space 39 and in the space between the lower electrode 37 and any grounded body of dispersed-phase material, such as the body 85, settling in the lower portion of the treating zone 17. This can be accomplished if the potential source 65 is a transformer providing two high-voltage secondary windings 86 and 87 respectively connected to the rods 62 and 82 but having a common connection that is grounded and thus connected to the container 10. Such secondary windings are additively connected and may be simultaneously energized from a single primary winding 89 or from separate primary windings.

Centrally below each of the three sections of the baffle plate structure 15 is an emulsion distributor 100 mounted on a corresponding riser pipe 101 connected to a manifold pipe 102 receiving emulsion under pressure from a line 103. Each distributor is aligned with openings 104, 105 and 106 of the electrodes 37, 36 and 35, respectively, and extends upwardly through the openings 104 and 105 to discharge radially outward in the main treating space 38.

Each of the distributors 100 includes a tubular outer member 110 (Fig. 5) flaring outwardly and terminating in a flow-bounding surface 111. Each distributor includes an inner or head member 113 flaring outwardly to a flow-bounding surface 114 capable of mating accurately with the surface 111 when lowered into contact therewith and thus closing a tapered passage 115 through which the emulsion is normally fed to an annular discharge space 116 when the surfaces 111 and 114 are separated a small fraction of an inch.

One of the members 110, 113 is adjustable in vertical position relative to the other to vary the width of the annular discharge space 116. Similarly, one of these members is preferably rotatable relative to the other to clear any obstructions from the discharge space 116 without changing the width thereof. In the illustrated embodiment, the head member 113 is made rotatable and adjustable through mechanism to be described.

In this connection, the lower end of each riser pipe 101 constitutes a control conduit 120 extending to a fitting 121 which is welded in the lowermost wall of the container 10. As best shown in Fig. 5, the fitting 121 is bolted to a control structure including a tubular member 122 carrying an index frame 123 having at its lower end a gauge member 124 adjustably bolted thereto. Within the tubular member 122 is a packing structure 126 receiving a shaft 127 to which the head member 113 is rigidly connected. To the lower end of this shaft member is fixed a hand wheel 130. The extreme lower end of the shaft member carries a gauge member 131 which is always separated from the gauge member 124 by a distance corresponding to the width of the annular discharge space 116, thus giving a visual indication of the setting of the distributor. By turning the hand wheel 130, the shaft 127 and the head member 113 turn about bearing means (not shown) in the distributor to move the surfaces 111 and 114 relative to each other and dislodge any foreign matter that may have settled in or adjacent the discharge space 116. The width of this space is conventionally only several thousandths of an inch and it has been found that improved distribution and improved emulsion treatment can be effected by manually rotating the head member 113 at infrequent intervals.

The lower end of the tubular member 122 carries a threaded head 134 which receives a threaded sleeve 135 having a shoulder 136. To the top of this shoulder a hand wheel 137 is clamped by a nut 138. Pressing against the bottom of the shoulder 136 is a thrust bearing 139 backed up by a member 140 attached to the shaft 127 by a pin 141. The bearing 139 takes the upward pull imposed on the head member 113 by the pressured stream of emulsion rising in the passage 115. At the same time, the bearing 139 permits the aforesaid turning of the shaft 127 without change in width of the discharge space 116. However, when the hand wheel 137 is turned, the threaded sleeve 135 raises or lowers relative to the head member 134 and thus raises and lowers the head member 113 to increase or decrease the width of the discharge space 116. To indicate this width in terms of decimals or fractions of an inch, the index frame 123 carries a scale 145 against which a sharp edge 146 of the hand wheel 137 may register. If more accurate readings are desired, the hand wheel 137 may carry peripheral graduations 147 against which the position of the scale 145 may be read to indicate with accuracy the fractional or decimal positions between the graduations on the scale 145.

It will be observed that the members 110 and 113 of the distributor are mechanically interlocked through the threads or teeth on the member 134 and 135. Heretofore, the head member 113 of such a distributor has been biased toward the member 110 by spring action. This has given trouble in treaters in which a plurality of distributors is connected to a manifold. Theoretically, if all of the distributors were biased by the use of identical springs, they should automatically open and close together with increased and decreased emulsion flow. However, this is not the case in practice both because it is almost impossible to obtain truly identical springs and because the stuffing boxes used with the individual distributors usually apply unequal restraining forces.

In treaters of the type illustrated it is important to be able accurately to adjust the relative flows through the distributors. The mechanical interlock of the present invention makes it possible to provide a micrometer-type adjustment for each distributor. Correspondingly, the amounts of emulsion discharging from the distributors can be equalized and the relative discharges will thereafter remain constant, the total emulsion stream being correspondingly divided between the distributors.

In the operation of the treater herein described, a thin sheet of the emulsion discharges radially outward at relatively high velocity from the annular discharge space 116 of each distributor, as indicated by the arrow 150, Fig. 3. The stream is immediately subjected to the double-voltage field in the main treating space 38 and its rate of outward flow rapidly decreases as it moves toward the remote narrow peripheral space 20. Nevertheless, there is a strong jet action tending to aspirate or recycle treated emulsion constituents through the openings 106 and 105 of the electrodes 35 and 36 respectively, as indicated by arrows 151 and 152. The presence of the baffle plate structure 15 severely limits the recirculation indicated by the arrow 151, as is desirable, and accentuates the recirculation indicated by the numeral 152. It is significant to notice, however, that the latter recirculation is drawn largely from the treating space 40 in which an intense or a double-voltage field is maintained. This is the result of using a stack of electrodes below the baffle plate structure 15 and has been found to make possible use of lower jet velocities from the distributor than would otherwise be the case.

At the same time, it is sometimes desirable to be able to adjust the amount of recirculation taking place through the opening 105, indicated by the arrow 152. For this purpose, the outer member 110 of the distributor carries a flange 155 (Fig. 5) carrying bolts 156 adjustably supporting a circular barrier or damper 160. This damper 160 is spaced adjustably from the boundary of the opening 105 to provide an adjustable-width annular zone 161 (Fig. 3) controlling the volume of the recycled material flowing therethrough.

The action of the electric fields is to coalesce the dispersed phase of the emulsion, usually present as aqueous droplets, into masses of sufficient size to gravitate from the continuous oil phase. By the time the treated emulsion constituents reach the vicinity of the brackets 32, most of the dispersed-phase material has separated from the oil. In the present invention, the oil space 16 is not relied upon to any large extent in settling additional dispersed-phase material from the oil. Instead, the treated oil rises through the narrow peripheral space 20 and is withdrawn therefrom through the usual oil effluent means 162 valved at 163 to build up a back pressure in the container. Likewise, the coalesced dispersed-phase material can be withdrawn continuously or periodically from the body 85 through the usual effluent means 164 valved at 165 to control the flow in such manner as to maintain the volume of the body 85 substantially constant.

It is not always essential in a sectional-type treater to employ the transverse spaces 21. Reliance can be placed on the narrow peripheral space immediately adjacent the container wall. However, use of the transverse spaces 21 offers some advantage, particularly in affording a more direct upward path for the separated oil in the vicinity thereof. In some instances, it has been found desirable to make each transverse space 21 of a width about double the space adjacent the wall of the container. It will be recognized that such a transverse space 21 may receive separated oil from two of the distributors. In fact, the flows from adjacent distributors meet in a zone below the transverse spaces 21. It must be recognized, however, that such meeting of the two streams does not establish any high impact pressure or head tending to force treated oil through the transverse spaces 21. It should be recognized also that the openings 63a through the baffle plate structure 15 passing the rods 62 and 82 are likewise in zones in which there is very little pressure head. As a result, the baffle plate structure 15 or the individual baffle means of the several sections can be said to be substantially impervious to flow of treated oil, such treated oil advancing to the oil zone 16 substantially exclusively through the narrow peripheral space 20, of which the transverse spaces 21 are parts.

Figure 7:
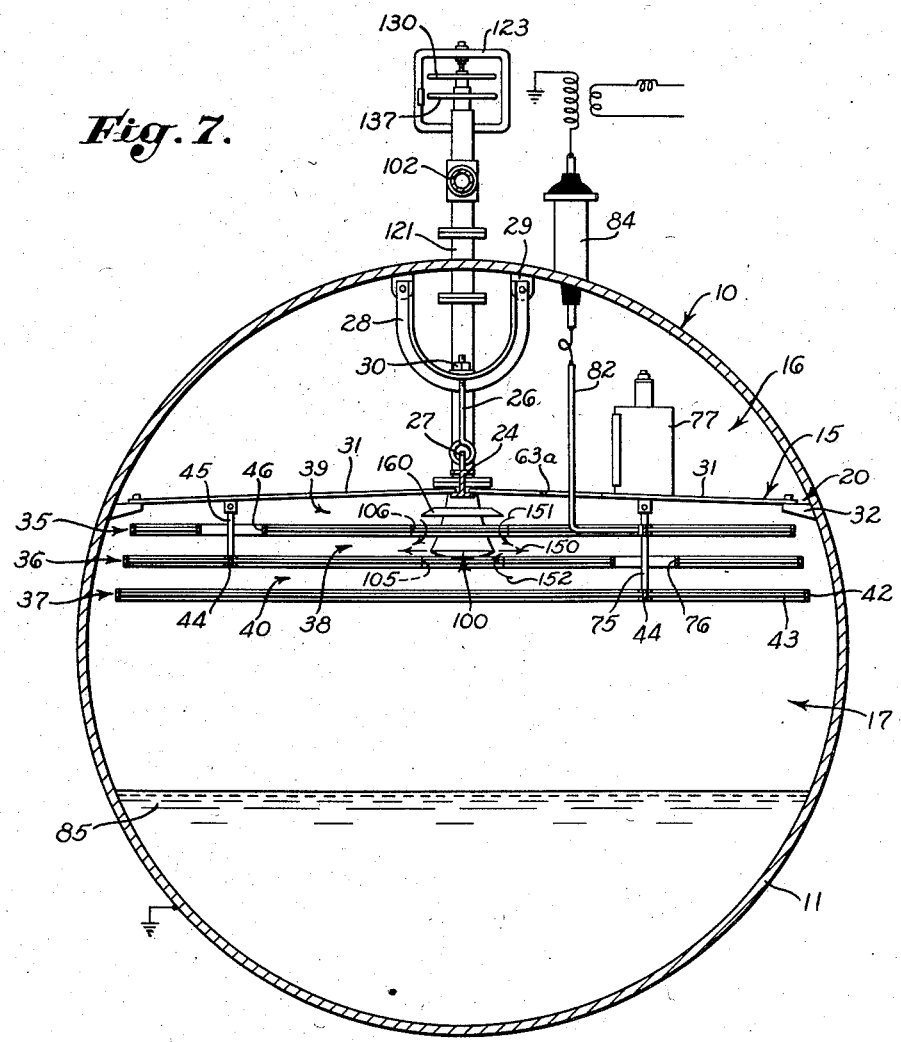
Fig. 7 is a sectional view, similar to Fig. 3, illustrating an alternative embodiment of the invention.

As shown in the alternative embodiment of Fig. 7, grounding of the baffle plate structure 15 makes it possible to introduce the emulsion from the top of the treater with many advantages. For example, it removes from the field below the lower electrode 37 the grounded piping supplying the emulsion to the distributor 100 and which varies the field pattern in the zone below such electrode. By inverting the emulsion supply system as suggested in Fig. 7, such piping is in the oil zone 16 in which no field is established. Such inversion also places in an accessible position the manifold pipe 102 and the distributor controls, permitting the container 10 to be installed at a lower elevation and effecting substantial savings in foundation costs, particularly in locations requiring earthquake-stressed designs. Such inversion also simplifies the construction and installation of the electrodes 36 and 37 below the distributor lip and shortens the distributor control shaft 127, making the latter easier to install.

With the arrangement of Fig. 7, the grounded baffle plate structure 15 can be cut away to receive but closely surround the distributor 100 which can be positioned between the sections of the I beam 24. The damper 160, if used, may be employed to control the circulation 151 through the opening 106 of the electrode 35.

Any of the embodiments of the invention may be employed with a simplified or single-transformer potential source in a manner suggested in Fig. 7. Here the electrodes 35 and 37 are maintained at the same potential by the rods 75 and are suspended from insulators in the housings 77, being energized through the housed bushing 84, as before. However, the electrode 36 is maintained at ground potential by connecting its supporting hangers 45 directly to the baffle plate structure 15, eliminating the housings 47 and the insulators therein. Alternate electrodes in the stack are thus at the same potential.

This effects substantial savings in costs as concerns the energizing and electrode supporting elements. At the same time, it permits remarkably good treatment with the electrode arrangements shown as these electrodes can be brought closer together to approach the same voltage gradients possible with the double-voltage system of Fig. 3. The electrode 36, being grounded, can be placed immediately below the lips of the distributor 100 which form the annular discharge space 16, without danger of short circuiting. This decreased spacing between the distributor lips and the electrode 36 is suggested in Fig. 7 and permits the emulsion to be discharged in a plane close to the electrode surface, a desirable feature.

It should be recognized that the method of electrode suspension of the invention provides a more efficient placement of insulators than with prior designs, thereby permitting the electrodes to be made lighter, with fewer and thinner structural members. This results in thinner electrodes with all electrode faces more nearly in a single plane even though the electrodes are of extensive area. As a result, more uniform electrode spacings can be maintained, permitting closer electrode spacings and also the use of insulators 51 designed for lesser mechanical loads.

In general, the present invention has been found greatly to increase the throughput of electric treaters. It also permits the use of lower pressure drops across the distributors, thus not only reducing pumping costs but permitting installation of electric treaters to meet certain customer-imposed limits on permissible pressure drop.

In many instances the distributor-induced circulations in the field zone between the lower electrode 37 and the body 85 of dispersed-phase material has eliminated pump induced sludge-breaking circulations in this zone, as have been necessary in many other electric treaters, particularly treaters in which such zone is of greater height or in which other electrode arrangements are used. Finally, the feature of suspending an energized electrode below but from a grounded structure, such as the baffle plate structure 15, is of substantial importance. This avoids the necessity of open holes in the structure to receive hangers for the energized electrodes. Such open holes interfere with the fluid-guiding function of the baffle plate structure 15 and also tend to cause short circuiting, failure of insulators disposed above such open holes, and sometimes poor treating action.

I claim as my invention:

1. In an electric emulsion treater, the combination of: a horizontally elongated container much greater in horizontal length than width; an extensive-area baffle means formed of electrically conducting material and connected electrically to said container; means for mounting said baffle means in a flat horizontal zone of said container to divide the interior of said container into a treating zone and an oil zone respectively below and above said baffle means, said baffle means including a plurality of substantially impervious sections each having peripheral edges conforming in shape to and spaced from said container to form narrow peripheral spaces, each section having a peripheral edge portion extending transversely of said container and spaced from a corresponding edge portion of an adjacent baffle to provide an additional narrow peripheral space, said impervious sections completely occupying at least about 80% of the horizontal cross-sectional area of said flat horizontal zone, all of said narrow peripheral spaces compositely representing less than 20% of said cross-sectional area and forming substantially the sole communication between said treating zone and said oil zone; means for establishing high-voltage electric fields in said treating zone below said baffle means, said field-establishing means comprising an electrode below and spaced from said baffle means and means for electrically insulating same from said container; means for supplying oil-continuous emulsion to be treated to said container at a plurality of points below the respective sections and spaced from each other along the length of the container for treatment by said electric fields to coalesce the dispersed phase material of said emulsion into masses settling to the lower portion of said container, the treated oil rising through said peripheral spaces to said oil zone; means for withdrawing treated oil from said oil zone; and means for withdrawing said settled masses of dispersed phase material from said lower portion of said container.

2. An electric emulsion treater as defined in claim 1 in which said electrode constitutes a first electrode, and in which said means for establishing said electric fields in said treating zone includes also a second electrode, said electrodes constituting a pair of superimposed electrodes, said treater including means for mounting said pair of electrodes in vertically spaced relation in a second horizontal zone of said container below said baffle means and bounded by the container walls, the uppermost of said electrodes being spaced vertically below said baffle means, said mounting means including means for electrically insulating said electrodes from each other, each of said electrodes being much greater in length than width and extending substantially throughout the length and width of said second horizontal zone, said first electrode having a periphery spaced a small distance from said container walls bounding said second horizontal zone.

3. An electric treater as defined in claim 1 in which said electrode comprises a plurality of horizontally-spaced horizontally-extending straight rods parallel to each other, said emulsion supply means including a plurality of emulsion discharge orifices in said treating zone respectively below said sections and respectively directed outwardly from vertical axes passing substantially centrally through said sections for delivering emulsion to said treating zone at a plurality of positions spaced lengthwise of said container.

4. In an electric emulsion treater, the combination of: a horizontal cylindrical container much longer in horizontal length than width and closed at its ends by outwardly domed heads; a substantially horizontal baffle plate structure dividing the interior of said container into a treating zone and an oil zone respectively below and above said baffle plate structure, said baffle plate structure including a plurality of substantially impervious sections spaced edge-to-edge from each other throughout the horizontal length of said container, said structure having peripheral edges corresponding in shape to the interior of said container and to said domed heads but spaced inwardly therefrom to form with the spaces between said edges a network of narrow peripheral spaces forming substantially the sole communication between said treating zone and said oil zone; electrode means comprising horizontal electrodes extending substantially throughout the horizontal cross-section of a horizontal zone of the container disposed below and parallel to said baffle plate structure; means for mounting said horizontal electrodes in superimposed fixedly-spaced electrically-insulated relation with each other in said horizontal zone below said baffle plate structure; means for establishing emulsion-treating high-voltage electric fields between such electrodes; means for delivering oil-continuous emulsion to be treated to said treating zone for treatment by said electric fields to coalesce the dispersed phase material of the emulsion into masses settling to the lower portion of said container, the treated oil rising through said peripheral spaces to said oil zone; and effluent means respectively communicating with said lower portion and with said oil zone for respectively withdrawing therefrom said settled masses of dispersed phase material and said treated oil.

5. An electric emulsion treater as defined in claim 4 in which the area of said horizontal zone below each of said baffle sections forms a corresponding treating area, and in which said means for delivering emulsion includes a plurality of emulsion distrbutors respectively at the centers of said treating areas.

6. An electric emulsion treater as defined in claim 5 in which said emulsion distributors have walls defining annular orifices in substantially the same horizontal plane and respectively concentric with the vertical axes of said treating areas, said annular orifices being respectively directed radially outward from said vertical axes for discharging the emulsion radially outward from such vertical axes from the center of said treating areas.

7. An electric treater as defined in claim 5 in which said electrodes include two superimposed foraminous electrodes extending continuously through the plurality of treating areas and extending substantially throughout the horizontal cross-section of said horizontal zone disposed below and parallel to said baffle plate structure and a third foraminous electrode therebetween, said mounting means electrically connecting said two superimposed electrodes while electrically insulating same from said third electrode and from said baffle plate structure, said field-establishing means including means for establishing electric fields between said third electrode and each of said superimposed electrodes and between the upper of said superimposed electrodes and said baffle plate structure.

8. An electric treater as defined in claim 4 including a plurality of electrical insulators, means for supporting the upper ends of said insulators from said baffle plate structure, and means for connecting the lower ends of said insulators in supporting relationship with said electrode means.

9. In an electric emulsion treater, the combination of: a container having upper and lower portions; an extensive-area baffle providing an opening but being otherwise substantially impervious; means for supporting said baffle in said container at a position intermediate said upper and lower portions to divide the interior of said container into a treating zone and an oil zone respectively below and above said baffle, there being a peripheral space between said baffle and said container for conducting material from said treating zone to said oil zone; a housing rising from said opening into said oil zone, said housing including an upper end wall within said container, said housing and said end wall forming an insulator space opening downwardly on said treating zone below said baffle; insulator means depending in said insulator space from said end wall; an electrode in said treating zone below said baffle; means for supporting said electrode from said insulator means; means for supplying a high-voltage potential to said electrode to establish an electric field thereadjacent; means for supplying an oil-continuous emulsion to be treated to said treating zone below said baffle; and effluent means communicating respectively with said lower portion of said container and said oil zone thereof.

10. In an electric emulsion treater, the combination of: a container having upper and lower walls; an inverted-cup housing defining an insulator pocket closed at its upper end but having an open lower end open to the space therebelow, said housing being made of metal; means for mounting said housing entirely within said container at an elevation between said upper and lower walls and spaced a substantial distance from the former, said last-named means electrically connecting said housing to said container; an insulator in said pocket suspended from said closed upper end thereof; an electrode below and facing said open lower end; means for suspending said electrode from said insulator; means for applying a high-voltage potential to said electrode to establish an electric field thereadjacent, said last-named means applying a potential difference between said electrode and said housing; means for delivering the emulsion to be treated to said electric field; and effluent means respectively connected to the upper and lower interior portions of said container to withdraw treated emulsion constituents therefrom.

11. In an electric emulsion treater, the combination of: a horizontally elongated container much greater in horizontal length than width; a plurality of hangers spaced from each other in a vertical plane bisecting said container; means for supporting the upper ends of said hangers from the upper portion of said container; a substantially horizontal baffle plate structure dividing the interior of said container into a treating zone and an oil zone respectively below and above said baffle plate structure; means for connecting the lower ends of said hangers in supporting relationship with said baffle plate structure, said baffle plate structure having a periphery spaced a small substantially uniform distance from the interior of said container to define a peripheral space forming substantially the sole communication between said treating zone and said oil zone; electrode means below said baffle plate structure; means for establishing emulsion-treating high-voltage electric fields in said treating zone adjacent said electrode means; means for delivering oil-continuous emulsion to be treated to said treating zone for treatment by said electric fields to coalesce the dispersed phase material of the emulsion into masses settling to the lower portion of said container, the treated oil rising through said peripheral space to said oil zone; and effluent means respectively communicating with said lower portion and with said oil zone for respectively withdrawing therefrom said settled masses of dispersed phase material and said treated oil.

12. An electric treater as defined in claim 11 including a plurality of brackets extending across said peripheral space, each bracket having portions respectively connected to said baffle plate structure and to said container to prevent swinging of said baffle plate structure from the support of said hangers.

13. An electric treater as defined in claim 12 in which said means for connecting the lower ends of said hangers in supporting relationship with said baffle plate structure includes a beam extending longitudinally of said container in said vertical plane, and means for connecting said beam to the lower ends of said hangers to be supported thereby, said baffle plate structure comprising flat plates on opposite sides of said vertical plane having inner edges supported by said beam and outer edges supported by said brackets.

14. In an electric emulsion treater, the combination of: a container; spaced electrodes defining a plurality of interelectrode treating spaces in said container; means for energizing said electrodes to establish emulsion-treating fields in said treating spaces; a source of emulsion under pressure; and a corresponding plurality of emulsion distributors respectively discharging into said container adjacent said treating spaces and connected to said source of emulsion under pressure, each distributor including a stationary tubular member having a lip providing an annular flow-bounding surface concentric with the axis of said tubular member and extending substantially radially with respect to said axis, a movable head member providing an annular flow-bounding surface coaxial with said axis and extending substantially radially with respect thereto, and means for mounting said head member to move both along said axis and about said axis to respectively change the spacing of said flow-bounding surfaces and rotate the flow-bounding surface of said head member relative to the flow-bounding surface of said tubular member, said flow-bounding surfaces being opposite each other to define a variable width annular emulsion discharge passage connected to said source of emulsion under pressure, said means for mounting said head member including a shaft connected rigidly to said head member to move therewith, a sleeve around and coaxial with said shaft, a thrust bearing interconnecting said sleeve and said shaft, means outside said container for turning said shaft relative to said sleeve to turn said head member relative to said tubular member about said axis, adjustment means for moving said sleeve in the direction of the shaft axis to change the spacing of said flow-bounding surfaces, and means for operating said adjustment means from a position outside said container.

15. In an electric emulsion treater, the combination of: a container; spaced electrodes defining a plurality of interelectrode treating spaces in said container; means for energizing said electrodes to establish emulsion-treating fields in said treating spaces; a source of emulsion under pressure; and a corresponding plurality of emulsion distributors respectively discharging into said container adjacent said treating spaces and connected to said source of emulsion under pressure, each distributor including a stationary tubular member having a lip providing an annular flow-bounding surface concentric with the axis of said tubular member and extending substantially radially with respect to said axis, a movable head member providing an annular flow-bounding surface coaxial with said axis, and extending substantially radially wth respect thereto, and means for mounting said head member to move both along said axis and about said axis to respectively change the spacing of said flow-bounding surfaces and rotate the flow-bounding surface of said head member relative to the flow-bounding surface of said tubular member, said flow-bounding surfaces being opposite each other to define a variable width annular emulsion discharge passage connected to said source of emulsion under pressure, said means for mounting said head member including a shaft rigidly connected to said head member to move therewith, a screw threaded member connected to said stationary tubular member, a rotatable sleeve having screw threads engaging the threads of said threaded member, said shaft extending into said sleeve, a thrust bearing rotatably connecting said shaft and said sleeve, means for turning said sleeve relative to said threaded member to change the spacing of said surfaces, and means operable separately from said last-named means for turning said shaft and its connected head member relative to said bearing and said tubular member.

16. An electric emulsion treater adapted to be connected to a source of emulsion under pressure, said electric treater including: a container; spaced electrodes defining at least one treating space in said container; means for energizing said electrodes to establish an emulsion-treating field in said treating space; and an emulsion distributor discharging into said container adjacent said treating space and connected to said source of emulsion under pressure, said distributor including a stationary tubular member having a lip providing an annular flow-bounding surface concentric with the axis of said tubular member and extending substantially radially with respect to said axis, a movable head member providing an annular flow-bounding surface coaxial with said axis and extending substantially radially with respect thereto, and means for mounting said head member to move both along said axis and about said axis to respectively change the spacing of said flow-bounding surfaces and rotate the flow-bounding surface of said head member relative to the flow-bounding surface of said tubular member, said flow-bounding surfaces being opposite each other to define a variable width annular emulsion discharge passage connected to said source of emulsion under pressure, said means for mounting said head member including a shaft connected rigidly to said head member to move therewith, a sleeve around and coaxial with said shaft, a thrust bearing interconnecting said sleeve and said shaft, means outside said container for turning said shaft relative to said sleeve to turn said head member relative to said tubular member about said axis, adjustment means for moving said sleeve in the direction of the shaft axis to change the spacing of said flow-bounding surfaces, and means for operating said adjustment means from a position outside said container.

References Cited in the file of this patent

UNITED STATES PATENTS

| Number | Name | Date |
|---|---|---|
| 1,334,962 | Niece et al. | Mar. 30, 1920 |
| 1,480,064 | Harris | Jan. 8, 1924 |
| 1,606,699 | De Groote | Nov. 9, 1926 |
| 1,724,263 | Eddy | Aug. 13, 1929 |
| 1,779,009 | Negro | Sept. 15, 1930 |
| 1,838,912 | Eddy | Dec. 29, 1931 |
| 2,393,328 | Mahone | Jan. 22, 1946 |
| 2,425,355 | Roberts | Aug. 12, 1947 |
| 2,527,690 | Turner | Oct. 31, 1950 |
| 2,663,687 | Bailey | Dec. 22, 1953 |

UNITED STATES PATENT OFFICE

CERTIFICATE OF CORRECTION

Patent No. 2,880,158

March 31, 1959

Delber W. Turner

It is hereby certified that error appears in the printed specification of the above numbered patent requiring correction and that the said Letters Patent should read as corrected below.

Column 2, line 10, for "one", first occurrence, read -- on --; column 9, line 54, for "center" read -- centers --; column 11, line 61, after "axis" strike out the comma.

Signed and sealed this 21st day of July 1959.

(SEAL)
Attest:
KARL H. AXLINE
Attesting Officer

ROBERT C. WATSON
Commissioner of Patents